G. E. R. ROTHENBUCHER.
GATE VALVE.
APPLICATION FILED FEB. 19, 1909.

935,233.

Patented Sept. 28, 1909.

2 SHEETS—SHEET 1.

Witnesses:
W. Schulz
Edward Schorr.

Inventor
George E. R. Rothenbucher
By his Attorney
Arthur E. Zuicfe.

G. E. R. ROTHENBUCHER.
GATE VALVE.
APPLICATION FILED FEB. 19, 1909.

935,233.

Patented Sept. 28, 1909.
2 SHEETS—SHEET 2.

Witnesses:
W. Schulz.
Edward Lehorr.

Inventor,
George E. R. Rothenbucher
By his Attorney
Arthur E. Zumpe.

UNITED STATES PATENT OFFICE.

GEORGE E. R. ROTHENBUCHER, OF ASTORIA, NEW YORK.

GATE-VALVE.

935,233.  Specification of Letters Patent.  Patented Sept. 28, 1909.

Application filed February 19, 1909. Serial No. 478,889.

*To all whom it may concern:*

Be it known that I, GEORGE E. R. ROTHENBUCHER, a citizen of the United States, residing at Astoria, county of Queens, State of New York, have invented new and useful Improvements in Gate-Valves, of which the following is a specification.

This invention relates to a gate valve of novel construction, more particularly adapted to be used in conjunction with high pressure water pipes, steam pipes etc.

The valve comprises essentially a sleeve adapted to be reciprocated at right angles to the flow of the liquid, and a pair of valve disks carried by said sleeve and adapted to be moved in opposite directions, so as to either close or open the liquid inlet and liquid outlet of the valve. Owing to the peculiar construction of the valve, wear of the valve disks is reduced to a minimum, leakage is avoided, and breakage of the valve and pipes connected thereto is effectively prevented.

Figure 1:
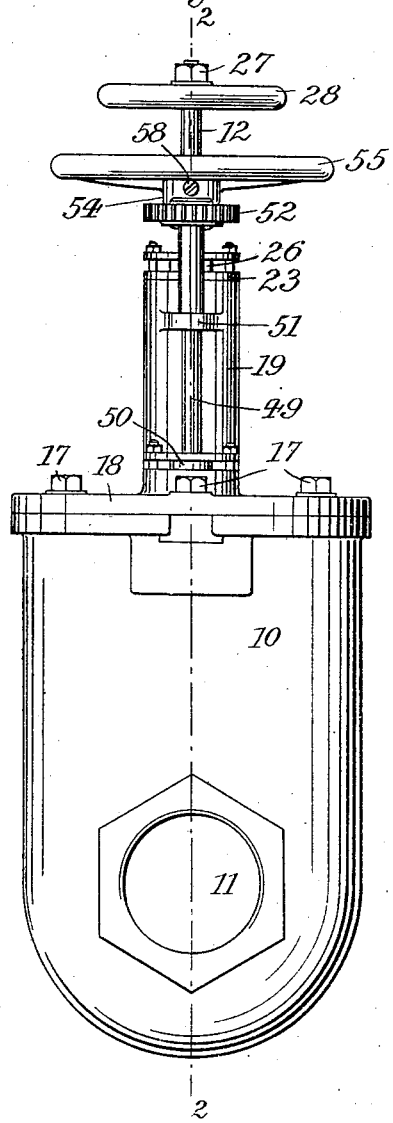
Figure 3:
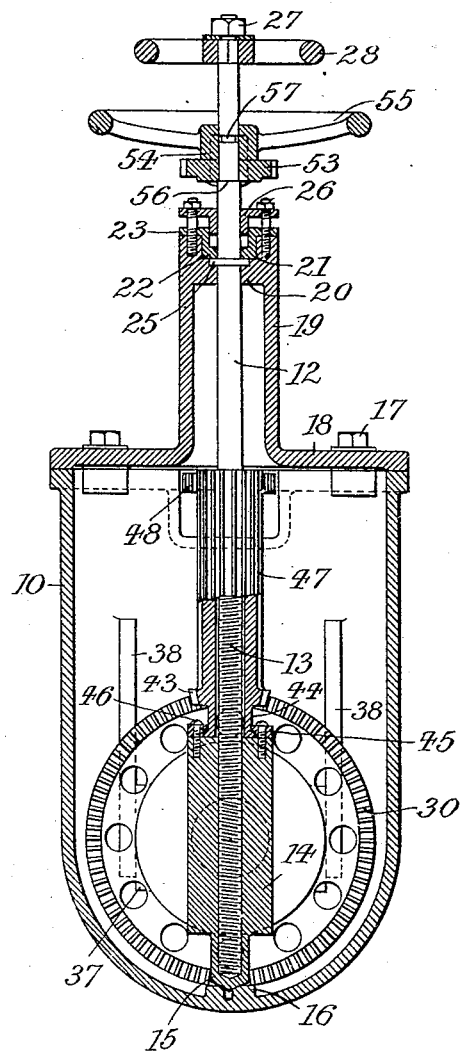
Figure 2:
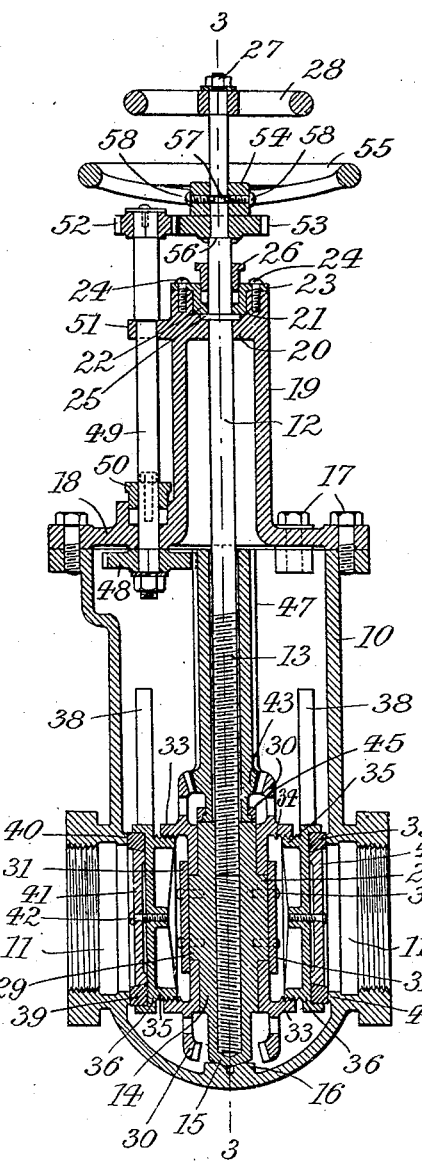
Figure 4:
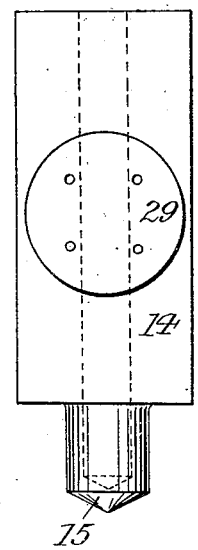
Figures 5, 6:
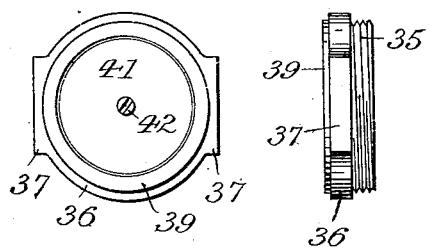

In the accompanying drawing: Figure 1 is a side view of my improved gate valve; Fig. 2 a vertical section on line 2—2, Fig. 1; Fig. 3 a vertical section on line 3—3, Fig. 2; Fig. 4 a side view of the sleeve; Fig. 5 a face view of one of the valve disks, and Fig. 6 a side view thereof.

The numeral 10 indicates a valve housing provided with a pair of alined lower openings 11 adapted for the passage of the liquid or other medium under pressure, the flow of which is to be controlled by the valve. Within housing 10 is centered a vertical spindle 12, having a lower threaded portion 13 that engages an internally threaded sleeve 14. The latter is provided at its lower end with a cone 15 adapted to be seated upon a correspondingly recessed boss 16, formed at the base of housing 10. To the top of the housing is secured, by screws 17, a cover 18 having a tubular extension 19, the upper perforated section 20 of which constitutes a bearing for spindle 12. Section 20 is recessed as at 21 for the reception of the lower projection 22 formed on a disk 23 which is secured to section 20 by screws 24. A collar 25, formed on spindle 12 and engaging a corresponding socket of section 20, prevents an axial displacement of spindle 12 during its rotation. In order to prevent an escape of the liquid along spindle 12, a stuffing box 26 is provided. To the upper reduced end of spindle 12 is secured by nut 27 a first hand wheel 28, by means of which the spindle may be rotated.

Sleeve 14 is provided with a pair of trunnions 29, upon each of which there is rotatably mounted a conical toothed wheel 30, a disengagement of the wheel from the sleeve being prevented by a disk 31 secured to trunnion 29 by screws 32. Each toothed wheel 30 has an outwardly projecting annular flange or rim 33 provided with an internal thread 34. The latter is engaged by the corresponding outer thread of an annular flange 35 projecting inwardly from a valve disk 36. Disk 36 is provided with a pair of lateral projections or lugs 37 which are guided between parallel rails 38 of housing 10, to prevent rotation of disk 36. At their outer sides, disks 36 are recessed for the reception of metallic packing rings 39 adapted to contact with seats 40 encircling passages 11, seats 40 being arranged parallel to one another. Rings 39 are made tapering at their inner sides to be engaged by similarly tapering clamping plates 41 which serve to retain rings 39 within the recesses of disks 36, the clamping plates being secured to said disks by screws 42. Toothed wheels 30 mesh into a common beveled gear wheel 43 having a lower hub 44 which is stepped into a correspondingly recessed plate 45 secured to sleeve 14 by screws 46. In this way wheel 43 may be freely rotated with relation to sleeve 14, while a disengagement therefrom is effectively prevented. From gear wheel 43, there extends upwardly an elongated toothed wheel 47 meshing into a pinion 48. The latter is fast on a vertical spindle 49 which extends through cover 18. To prevent the escape of liquid, a stuffing box 50 is secured to cover 18. Spindle 49 is journaled in a bearing 51 of tubular extension 19 and carries at its upper end a relatively fixed pinion 52 that engages a pinion 53 rotatable on spindle 12 and secured to the hub 54 of a second hand wheel 55. Spindle 12 is preferably stepped as at 56 to afford a seat for pinion 53, and it is further provided with a circumferential groove 57. The latter is engaged by a number of screws 58 tapped into hub 54 to prevent an axial displacement of wheel 55 on spindle 12.

It will be seen that a rotation imparted to hand wheel 55 will cause conical wheels 30 to be turned in opposite directions, motion being transmitted through spindle 12, pinions 53, 52, spindle 49, pinion 48, elongated toothed wheel 47 and beveled gear wheel 43. This rotation of wheel 30 will by threaded rims 33, 35 effect either a spreading or a contracting of valve disks 36 according to the direction in which hand wheel 55 is turned, any rotation of the disks being prevented by the engagement of their projection 37 with rails 38. In this way packing rings 39 are either forced against seats 40, or they are withdrawn therefrom. A rotation of hand wheel 28 will through threaded spindle section 13 effect a raising or lowering of sleeve 14 and consequently of valve disks 36, according to the direction in which hand wheel 28 is turned. During an upward movement, elongated toothed wheel 17 remains in permanent engagement with pinion 48, wheel 47 being accommodated within tubular extension 19 of cover 18.

If it is desired to open the valve, hand wheel 55 is first so rotated that disks 36 are disengaged from seats 40. Hand wheel 28 is then turned in such a direction that sleeve 14 together with disks 36 is raised, during which movement, extensions 37 of disks 36 ride along rails 38 to prevent a rotation of said disks. In this way the liquid will flow unobstructed through the valve. If it is desired to close the valve, hand wheel 28 is first rotated to lower the gate until cone 15 engages seat 16, whereupon hand wheel 55 is turned to spread disks 36 and force them tightly against seats 40.

It will be seen that by my improved construction, a reliable and durable gate valve is provided. As disks 36 must first be slightly withdrawn from their seats before the gate can be raised, a gradual admission of the liquid or other medium to the valve is insured, so that any heavy shocks are avoided and breakage of the valve housing or of the pipes connected thereto is effectively prevented. As the valve disks during the closure and opening of the valve move in a rectangular direction to their seats, any sliding movement of the packing rings upon the seats is avoided. A sliding movement of the packing rings is especially objectionable, when liquids containing solid impurities are fed through the valve. When these impurities are caught between valve and seat while closing the valve the packing rings are quickly worn out, which will soon result in a leakage of the valve. With my valve, however, such impurities are pressed into the relatively soft metal of the packing ring, so that wear and leakage of the valve are effectively prevented.

I claim:

1. A gate valve comprising a housing, a screw spindle rotatably mounted therein, a threaded sleeve engaged by the screw spindle, a gear wheel rotatably mounted on the sleeve, and a valve disk engaged by the gear wheel.

2. A gate valve comprising a housing, a screw spindle rotatably mounted therein, a threaded sleeve engaged by the screw spindle, a gear wheel rotatably mounted on the sleeve and having a threaded rim, and a valve disk engaged by said rim.

3. A gate valve comprising a housing, a screw spindle rotatably mounted therein, a threaded sleeve engaged by the screw spindle, a gear wheel rotatably mounted on the sleeve and having a threaded rim, and a valve disk having a threaded rim that engages the wheel rim.

4. A gate valve comprising a housing, a screw spindle rotatably mounted therein, a threaded sleeve engaged by the screw spindle, a gear wheel rotatably mounted on the sleeve and having an internally threaded rim, and a valve disk having an externally threaded rim, that engages the wheel rim.

5. A gate valve comprising a housing, a screw spindle rotatably mounted therein, a threaded sleeve engaged by the screw spindle and having a pair of trunnions, threaded conical gear wheels engaging the trunnions, threaded valve disks engaging the gear wheels, means for rotating the gear wheels, and means for holding the valve disks against rotation.

6. A gate valve comprising a housing, a screw spindle rotatably mounted therein, a threaded sleeve engaged by the screw spindle, threaded gear wheels rotatably mounted on the sleeve, threaded valve disks engaging the gear wheels, a beveled gear wheel meshing into the threaded gear wheels, and means for rotating said beveled gear wheel.

7. A gate valve comprising a housing, a screw spindle rotatably mounted therein, a threaded sleeve engaged by the screw spindle, threaded gear wheels rotatably mounted on the sleeve, threaded valve disks engaging the gear wheels, a beveled gear wheel loosely mounted on the screw spindle and meshing into the threaded gear wheels, and means independent of the spindle for rotating the beveled gear wheel.

8. A gate valve comprising a housing, a screw spindle rotatably mounted therein, a threaded sleeve engaged by the screw spindle, threaded gear wheels rotatably mounted on the sleeve, threaded valve disks engaging the gear wheels, a beveled gear wheel loosely mounted on the screw spindle and meshing into the threaded gear wheels, an elongated gear wheel integral with the beveled gear wheel, a pinion engaging the elongated gear wheel, and means for rotating the pinion.

9. A gate valve comprising a housing, a screw spindle rotatably mounted therein and carrying a first hand wheel, a threaded sleeve engaged by the screw spindle, conical gear wheels rotatably mounted on the sleeve and having threaded rims, valve disks having threaded rims that engage the wheel rims, a beveled gear wheel engaging the conical gear wheels, and a second hand wheel loosely mounted on the spindle and operatively connected to the beveled gear wheel.

10. A gate valve comprising a housing, a cover secured thereto and having a tubular extension, a screw spindle centered within said extension, a threaded sleeve engaging the spindle, a pair of conical gear wheels rotatably mounted on the sleeve, valve disks engaged by said gear wheels, a beveled gear wheel meshing into the conical gear wheels, an elongated gear wheel integral with the beveled gear wheel and adapted to be received by the tubular cover extension, a pinion engaging the elongated gear wheel and means for operating said pinion.

GEORGE E. R. ROTHENBUCHER.

Witnesses:
 La Vergne Bronk,
 Charles R. Krueger.